United States Patent
Smith et al.

(12) 
(10) Patent No.: US 6,659,217 B2
(45) Date of Patent: Dec. 9, 2003

(54) DRIVE ASSEMBLY FOR LOW FLOOR VEHICLE

(75) Inventors: Mark C. Smith, Troy, MI (US); John L. Bennett, Fraser, MI (US); Chihping Kuan, Rochester Hills, MI (US); John K. Ma, Rochester, MI (US); William C. Sullivan, Newark, OH (US); Edward J. Eshelman, Rochester Hills, MI (US); Dean M. House, Pataskala, OH (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 34 days.

(21) Appl. No.: 10/077,362

(22) Filed: Feb. 15, 2002

(65) Prior Publication Data

US 2003/0155170 A1 Aug. 21, 2003

(51) Int. Cl.[7] .......................... B60K 17/16; B60K 17/24
(52) U.S. Cl. ..................... 180/363; 180/348; 180/376; 180/379
(58) Field of Search .................... 180/348, 363, 180/371, 372, 376, 379, 380, 255, 256, 24.08, 24.11, 24.12

(56) References Cited

U.S. PATENT DOCUMENTS

| | | | | |
|---|---|---|---|---|
| 1,086,917 A | * | 2/1914 | Horstmann | 180/348 |
| 1,424,867 A | * | 8/1922 | Wolf | 180/363 |
| 3,035,655 A | * | 5/1962 | Lee | 180/255 |
| 3,860,082 A | * | 1/1975 | Testore | 180/24.11 |
| 3,948,337 A | * | 4/1976 | Richardson et al. | 180/256 |
| 4,100,986 A | | 7/1978 | Shipitalo | |

FOREIGN PATENT DOCUMENTS

EP 456096 A1 * 11/1991 ........... B60K/17/36

* cited by examiner

Primary Examiner—Peter C. English
(74) Attorney, Agent, or Firm—Carlson, Gaskey & Olds

(57) ABSTRACT

A drive unit assembly utilizes a single input to drive a pair of laterally spaced wheel ends. Each wheel end is suspended independently from the other. The input is operatively coupled to only one of the wheel ends and an exposed axle shaft assembly interconnects the input to the opposite wheel end. The axle shaft assembly includes multiple shaft members to interconnect the laterally spaced wheel ends. One of the axle shaft members is mounted to a vehicle floor structure with a bearing mount and includes connection joints at either end to accommodate the independent motion of each wheel end. The floor and the shaft member move together during suspension travel, allowing the floor to have a lower profile than is traditionally available.

20 Claims, 3 Drawing Sheets

DRIVE ASSEMBLY FOR LOW FLOOR VEHICLE

BACKGROUND OF THE INVENTION

This invention relates to drive unit assembly, and more particularly to a drive unit assembly for a mass transit vehicle, which provides a significantly lower floor profile.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers as well as for children.

Mass transit vehicles typically have several axles that support, drive and steer the vehicle. Many such vehicles provide a rigid axle having an input positioned off-center near one wheel end to form an inverted portal axle configuration. Disadvantageously, this arrangement necessarily eliminates the ride benefits of independent suspension systems.

Another disadvantage with this type of axle is that the low floor profile is limited by the portal axle housing. The system uses an axle shaft assembly that extends underneath the vehicle from the input to the opposite wheel. The input is a differential with a gearset coupled to the axle shaft assembly to drive the wheel ends. The axle assembly includes a short shaft member coupled to drive the wheel end that receives the input directly and a long shaft member coupled to drive the opposite wheel end. The differential and axle shaft assembly are enclosed within an axle housing that extends underneath the floor of the vehicle. Currently, the height between the vehicle floor and ground level is not low enough due to the required suspension clearance between the vehicle floor and the axle housing and bowl for the differential.

Accordingly, it is desirable to provide a drive unit assembly with a single input for driving opposing wheel ends that provides an improved low floor profile to facilitate access to the vehicle.

SUMMARY OF THE INVENTION

A vehicle drive unit assembly utilizes a single input to drive opposing wheel ends. Each wheel end is suspended independently and the need for an axle housing is eliminated by externally mounting an axle shaft assembly to interconnect the wheel ends. The input is operatively coupled to only one of the wheel ends and the axle shaft assembly includes multiple shaft members that interconnect the input to the other wheel end. One of the axle shaft members is mounted to a vehicle floor with a bearing mount and includes connection joints at either end to accommodate the independent motion of each wheel end. The floor and the shaft member move together during suspension travel, allowing the floor to have a lower profile then is traditionally available.

In the preferred embodiment, the wheel end assemblies include first and second wheel hubs, respectively, that define respective axes of rotation that move vertically independently from each other. Also, the axle shaft assembly is preferably comprised of at least three (3) axle shaft members. A first axle shaft member is mounted to the vehicle floor, a second axle shaft member is used to interconnect one wheel end assembly to the first axle shaft member, and a third axle shaft member is used to interconnect the other wheel end assembly to the first axle shaft member. The first axle shaft member defines a first shaft axis that is parallel to the axes of rotation for the wheel hubs and the second and third axle shaft members define second and third shaft axes that are transverse to the first shaft axis. Constant velocity joints are mounted at each end of each of the three shafts to accommodate the independent motion of each wheel end.

The subject invention provides a drive unit assembly with a single input for driving opposing wheel ends, which provides an improved low floor profile to facilitate access to a vehicle. These and other features of the present invention can be best understood from the following specifications and drawings, the following of which is a brief description.

DETAILED DESCRIPTION OF A PREFERRED EMBODIMENT

Figure 1A:
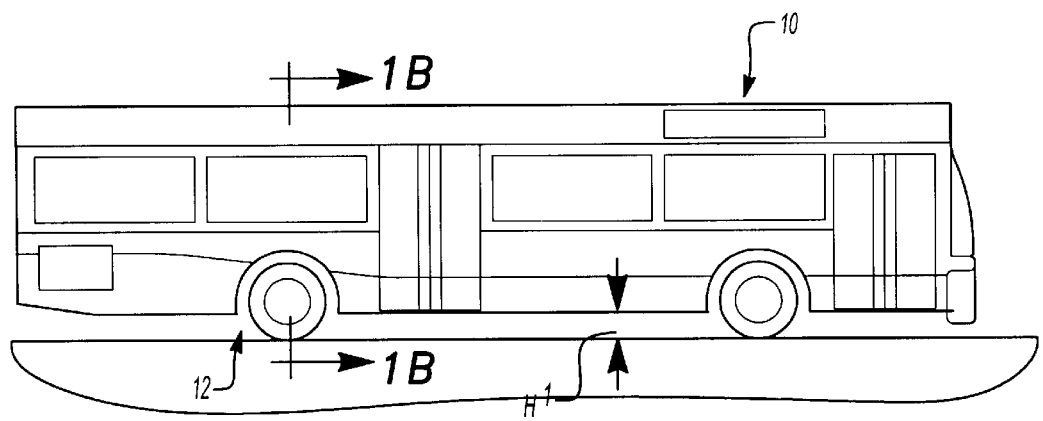
FIG. 1A is side view of a vehicle incorporating a prior art drive unit assembly.
Figure 1B:
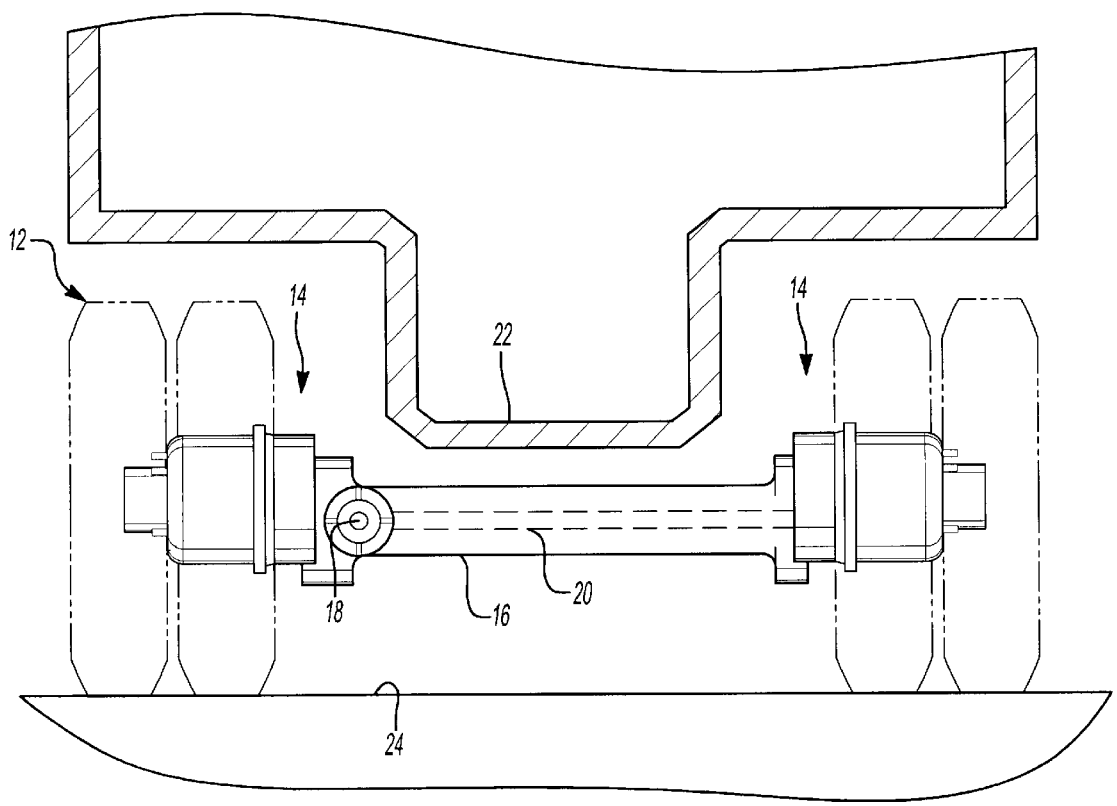
FIG. 1B is a cross-sectional view as indicated at line 1B of FIG. 1A.

A vehicle 10 incorporating a traditional inverted portal axle 12 is shown in FIGS. 1A and 1B. The inverted portal axle 12 includes a pair of wheel end assemblies 14 interconnected by an axle housing 16. An input 18 is positioned near one of the wheel end assemblies 14 and an axle shaft 20 connects the input 18 to the other wheel end assembly 14. The inverted portal axle 12 defines a floor profile having a height H1 between a vehicle floor 22 and the ground 24. Currently, the axle housing 16 limits this height H1. Traditionally, this height H1 is approximately 400 mm near the front of the vehicle and is 450 mm over the rear inverted portal axle 12.

Figure 2A:
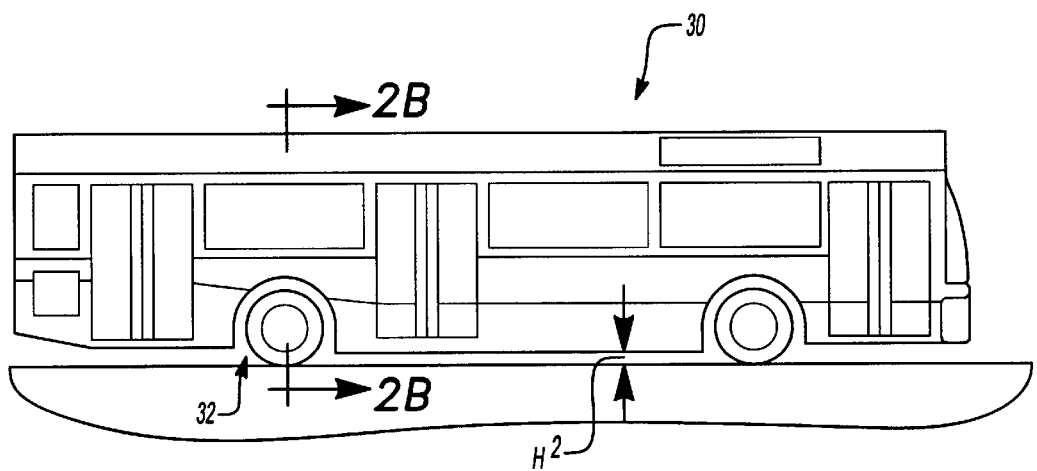
FIG. 2A is a side view of a vehicle with a drive unit assembly incorporating the subject invention.
Figure 2B:
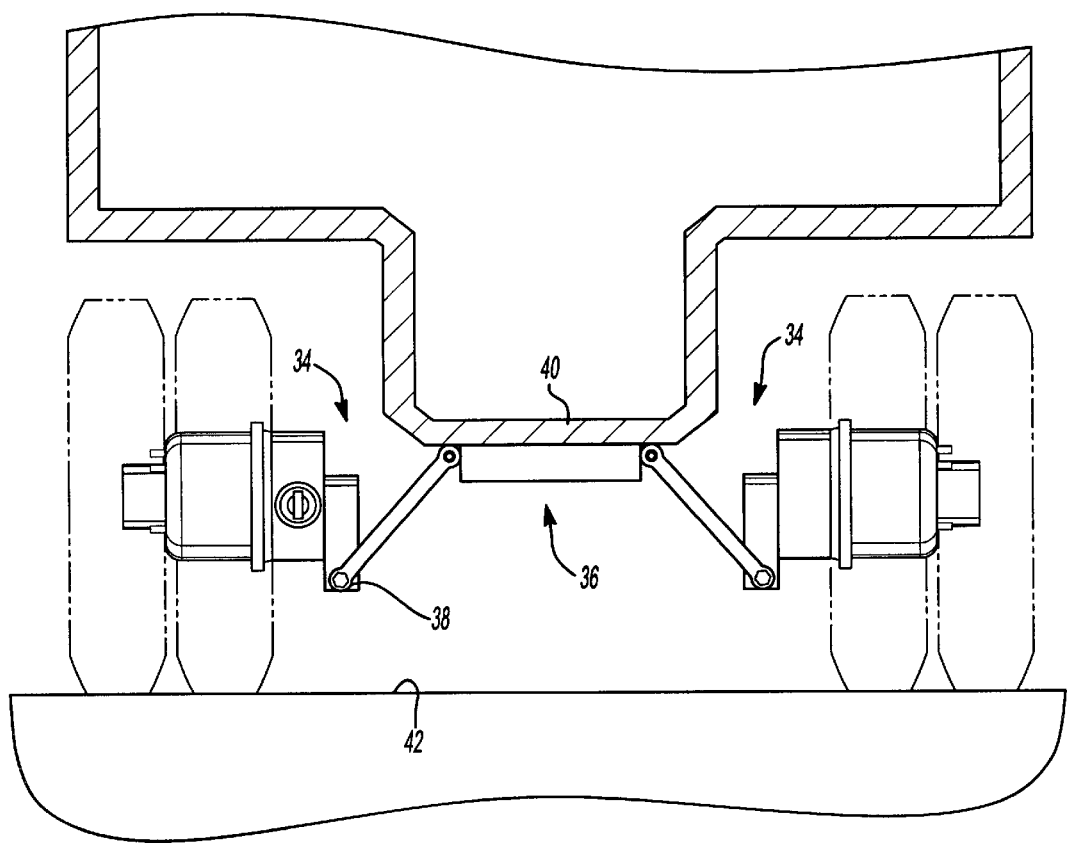
FIG. 2B is a schematic cross-sectional view as indicated at line 2B of FIG. 2A.

In order to facilitate ingress and egress from vehicles such as buses, trolley cars, etc. the floor profile should be lower to the ground. A vehicle 30 with a unique drive unit assembly 32 is shown in FIGS. 2A and 2B. The drive unit assembly 32 includes a pair of wheel end assemblies 34 that are interconnected by an exposed axle shaft assembly, shown generally at 36. An input 38 provides driving torque to only one of the wheel end assemblies 34 and the axle shaft assembly 36 transfers this torque to the other of the wheel end assemblies 34. The drive unit assembly 32 defines a floor profile having a height H2 between a vehicle floor 40 and the ground 42 that is less than 400 mm.

Figure 3:
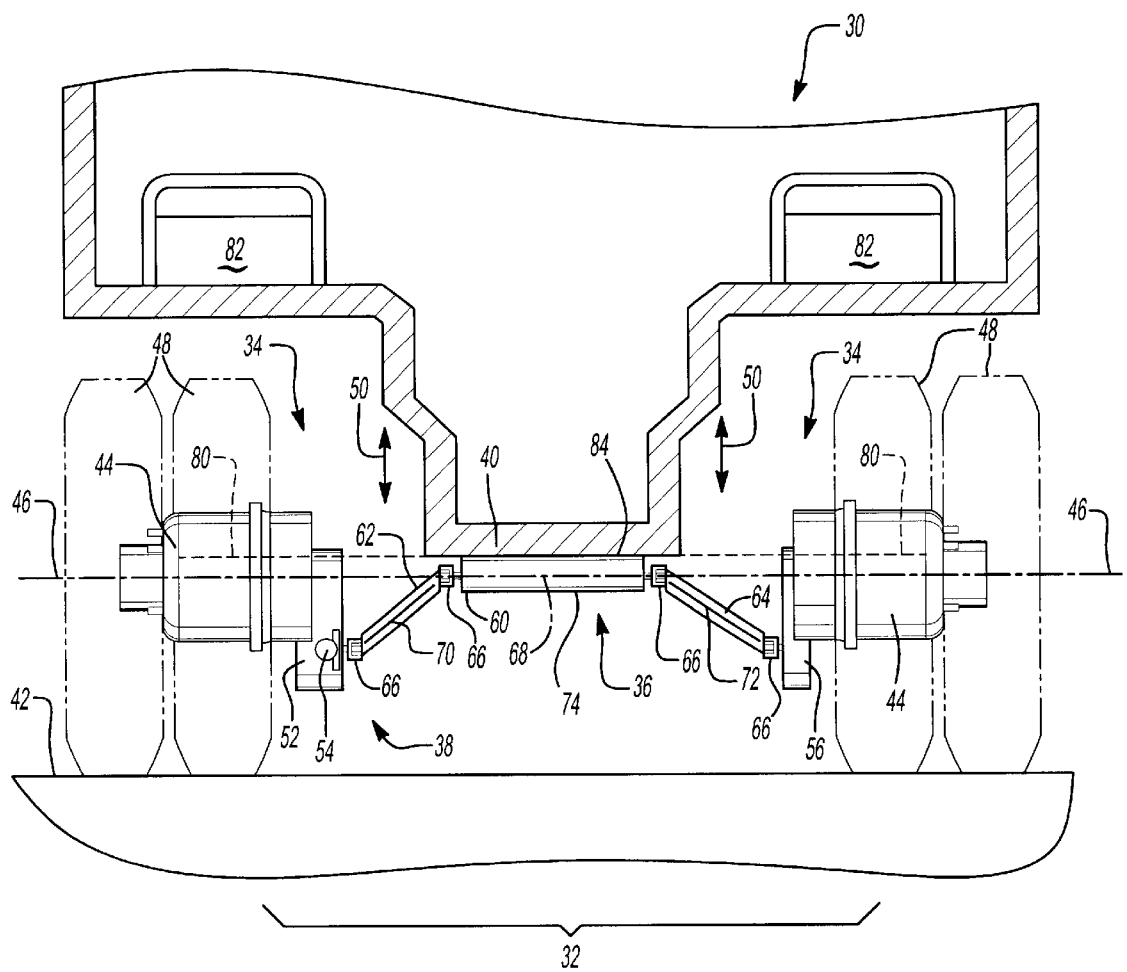
FIG. 3 is a detailed cross-section view showing the drive unit assembly of FIG. 2B.

A more detailed view of the subject drive unit assembly 32 is shown in FIG. 3. Each wheel end assembly 34 includes a wheel hub and drum assembly 44 that defines an axis of rotation 46. Tires 48 are mounted for rotation with the hub and drum assemblies 44 as is known in the art. Each wheel end 34 is independently suspended such that the axes of rotation 46 of each respective wheel end can move relative to the other during suspension travel indicated at by an arrow at 50. An example of an independent wheel suspension is disclosed in pending application 09/841,343 filed on Apr.

24, 2001 assigned to the assignee of the subject invention and herein incorporated by reference. This is just one example of an independent suspension and it should be understood that other independent suspension mechanisms could also be used.

The input 38 is preferably a differential assembly 52 with a ring and pinion gear set 54 that is coupled to the axle shaft assembly 36 so that torque is transmitted to both wheel ends 34. The differential assembly 52 includes gearing to transfer the torque to a proper input height for the wheel end 34 adjacent the input 38. The wheel end 34 opposite from the input 38 includes a helical gear case 56 to transfer the torque to a proper input height for the wheel. Preferably, three (3) helical gears (pinion, idler, driven gears) are used to move the input torque to the proper wheel height.

The axle shaft assembly 36 is preferably a three-piece shaft assembly. A first axle shaft member 60 is mounted to a vehicle structure, a second axle shaft member 62 interconnects one wheel end assembly 34 to the first axle shaft member 60, and a third axle shaft member 64 interconnects the other wheel end assembly 34 to the first axle shaft member 60. Constant velocity joints 66 are mounted at each end of the axle shaft members 60, 62, 64 to accommodate the independent motion of each wheel end assembly 34 during suspension travel 50. Constant velocity (CV) joints 66 provide consistent drive shaft speeds regardless of the operating angle of the joints. The operation of CV joints 66 is well known and will not be discussed in detail. While CV joints are preferred, it should be understood that other similar joint connections known in the art could also be used.

The first axle shaft member 60 defines a shaft axis 68 that is parallel to the axes of rotation 46 for each of the wheel end assemblies 34. The second axle shaft member 62 defines a shaft axis 70 that is transverse to the first shaft axis 68 and the wheel end axes of rotation 46. The third axle shaft member 64 defines a shaft axis 72 that is transverse to the first shaft axis 68 and the wheel end axes of rotation 46. Each of the axle shaft members 60, 62, 64 are externally mounted such that the shaft members 60, 62, 64 are exposed to the external environment.

Figure 4:
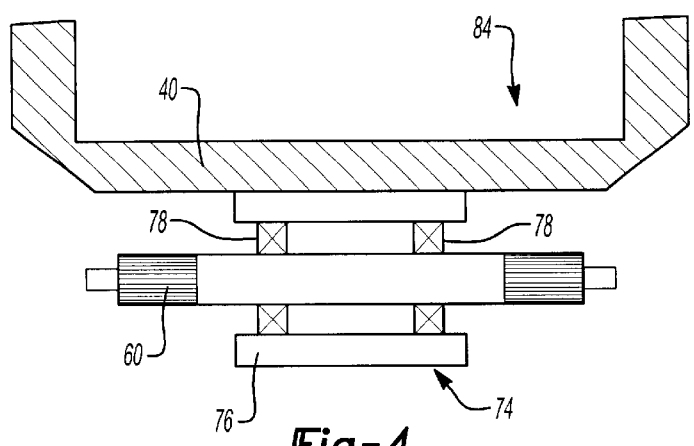
FIG. 4 is schematic view showing one embodiment of a bearing mount for the subject invention.

As discussed above, the first axle shaft member 60 is mounted to a vehicle structure. Preferably, the first axle shaft member 60 is the center shaft member and is mounted directly to a vehicle floor understructure with a bearing mount 74. Preferably, the bearing mount 74 is a pillow block (shown in FIG. 4) that includes a housing 76 and at least one bearing 78 to rotatably support the shaft member 60 for rotation within the housing 76. The shaft member 60 and bearing mount 74 are mounted to the floor structure such that the shaft member 60, floor 40, and bearing mount 74 move together during suspension travel 50.

The floor 40 has a pair of first profile segments 80 extending longitudinally along either side of a longitudinal axis of the vehicle underneath passenger seats 82 and a second profile segment 84 extending longitudinally along the center of the vehicle between the first profile segments 80. The bearing mount is preferably mounted underneath the second profile segment 84.

This unique drive unit assembly 32 provides for a lower vehicle floor 40 by eliminating the need for a center axle housing. This is achieved by independently suspending each wheel end 34 and providing an input via a differential carrier 52 to only one of the suspended wheel ends 34. The input into the differential carrier 52 is positioned low enough such that power is transmitted through the carrier 52 to the opposite wheel end 34 via the exposed axle shaft assembly 36. This combination provides for floor to ground heights of less than 400 mm. This significant lowering of the vehicle floor facilitates the ingress and egress of passengers.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A drive system for a vehicle having a low floor profile comprising:
   a first wheel assembly defining a first rotational axis;
   a second wheel assembly defining a second rotational axis;
   a single drive input including a differential operatively coupled to drive at least one of said first and second wheel assemblies; and
   an axle shaft assembly interconnecting said first and second wheel assemblies for transferring operational driving torque from said drive input at one of said first and second wheel assemblies to the other of said first and second wheel assemblies, said axle shaft assembly including at least a first axle shaft member having a first shaft axis parallel to said first and second rotational axes and a second axle shaft member having a second shaft axis transverse to said first and second rotational axes.

2. A system according to claim 1 wherein said axle shaft assembly includes a third axle shaft member having a third shaft axis transverse to said first and second rotational axes wherein said first axle shaft member is mounted to a vehicle structure, said second axle shaft member interconnects said first axle shaft member to said first wheel assembly, and said third axle shaft member interconnects said first axle shaft member to said second wheel assembly.

3. A system according to claim 2 including a pillow block mounted for movement with said vehicle structure during suspension travel, said pillow block having at least one bearing assembly for rotatably supporting said first axle shaft member.

4. A system according to claim 3 wherein said vehicle structure is a vehicle floor having first profile segments extending longitudinally along either side of a vehicle and a second profile segment extending longitudinally along the center of the vehicle between said first profile segments wherein said pillow block is mounted underneath said second profile segment.

5. A system according to claim 3 wherein said vehicle structure comprises a vehicle floor and wherein said pillow block moves vertically with said vehicle floor during suspension travel.

6. A system according to claim 2 wherein said first wheel assembly includes a first wheel hub and a first independent suspension assembly independently supporting said first wheel hub and said second wheel assembly includes a second wheel hub and a second independent suspension assembly independently supporting said second wheel hub such that said first and second axes of rotation are vertically movable relative to each other.

7. A system according to claim 2 wherein said second axle shaft member is operatively coupled to said differential at one end and is operatively coupled to said first axle shaft member at an opposite end.

8. A system according to claim 7 including a helical gear assembly mounted to one of said first and second wheel assemblies on an opposite vehicle side from said differential wherein said third axle shaft member is operatively coupled to said helical gear assembly at one end and is operatively coupled to said first axle shaft member at an opposite end.

9. A system according to claim 2 wherein said first, second, and third axle shaft members are externally mounted such that said shaft members are exposed to external environment.

10. A system according to claim 1 including a helical gear assembly mounted to drive the other of said first and second wheel assemblies at a position opposite from said differential wherein said differential transfers driving torque from said input to one of said first and second wheel assemblies and said helical gear assembly transfers driving torque from said axle shaft assembly to the other of said first and second wheel assemblies.

11. A system according to claim 1 wherein said input is positioned at a vertically lower position relative to ground level than said first and second rotational axes.

12. A vehicle drive unit comprising:
a first wheel hub defining a first axis of rotation that is substantially transverse to a vehicle longitudinal axis;
a second wheel hub defining a second axis of rotation that is substantially transverse to said vehicle longitudinal axis;
a first wheel end assembly independently supporting said first wheel hub such that said first axis of rotation is vertically movable relative to said second axis of rotation;
a second wheel end assembly independently supporting said second wheel hub such that said second axis of rotation is vertically movable relative to said first axis of rotation;
an input having a differential operatively coupled to drive one of said first and second wheel end assemblies for providing operational driving torque for both said first and second wheel hubs; and
an axle shaft assembly interconnecting said first and second wheel end assemblies for transferring operational driving torque from said input at one of said first and second wheel end assemblies to the other of said first and second wheel end assemblies wherein said axle shaft assembly includes at least one exposed shaft member mounted externally from said first and second wheel hubs and wheel end assemblies.

13. A drive unit according to claim 12 wherein said at least one exposed shaft member comprises first axle shaft member mounted to a vehicle structure, a second axle shaft member interconnecting said first wheel end assembly to said first axle shaft member, and a third axle shaft member interconnecting said second wheel end assembly to said first axle shaft member.

14. A drive unit according to claim 13 wherein said first axle shaft member defines a first shaft axis, said second axle shaft member defines a second shaft axis, and said third axle shaft member defines a third shaft axis wherein said first shaft axis is parallel to said first and second axes of rotation, and said second and third shaft axes are transverse to said first and second axes of rotation.

15. A drive unit according to claim 13 wherein said second axle shaft member is operatively coupled to said differential at one end and is operatively coupled to said first axle shaft member at an opposite end.

16. A drive unit according to claim 15 including a helical gear assembly mounted to one of said first and second wheel end assemblies opposite from said differential wherein said third axle shaft member is operatively coupled to said helical gear assembly at one end and is operatively coupled to said first axle shaft member at an opposite end.

17. A drive unit according to claim 13 including a pillow block mounted for vertical movement with a vehicle floor with at least one bearing assembly for rotatably supporting said first axle shaft member.

18. A vehicle drive unit assembly comprising:
a first wheel end independently suspended and positioned on one lateral side of a vehicle for rotation about a first axis;
a second wheel end independently suspended and positioned directly across from said first wheel end at an opposite lateral side of the vehicle for rotation about a second axis parallel to said first axis;
an input having a differential operatively coupled to one of said wheel ends;
an axle shaft assembly interconnecting said input to the other of said wheel ends, said axle shaft assembly including at least one axle shaft member mounted to a vehicle floor structure with a bearing mount such that said floor structure and said shaft member move together in a direction transverse to said first and second axes during suspension travel.

19. An assembly according to claim 18 wherein said at least one axle shaft member comprises a first axle shaft member mounted to said vehicle floor structure, a second axle shaft member interconnecting said first wheel end to said first axle shaft member, and a third axle shaft member interconnecting said second wheel end to said first axle shaft member and wherein said bearing mount is a pillow block having a housing mounted directly to said vehicle floor structure and including at least one bearing for supporting said first axle shaft member for rotation with respect to said housing.

20. An assembly according to claim 18 wherein said first and second axes are vertically closer to said vehicle floor structure than said input.

* * * * *

UNITED STATES PATENT AND TRADEMARK OFFICE
CERTIFICATE OF CORRECTION

PATENT NO.   : 6,659,217 B2
DATED        : December 9, 2003
INVENTOR(S)  : Smith et al.

It is certified that error appears in the above-identified patent and that said Letters Patent is hereby corrected as shown below:

Column 5,
Line 47, please insert -- a -- after "comprises" and before "first"

Signed and Sealed this

Sixteenth Day of March, 2004

JON W. DUDAS
*Acting Director of the United States Patent and Trademark Office*